United States Patent [19]

McCrae et al.

[11] Patent Number: 5,366,546
[45] Date of Patent: Nov. 22, 1994

[54] PRODUCTION OF PIGMENT COMPOSITIONS

[75] Inventors: James M. McCrae, Stewarton; Anne M. Keirs, Paisley; John A. Nimmo, Troon, all of Scotland

[73] Assignee: Ciba-Geigy Corporation, Ardsley, N.Y.

[21] Appl. No.: 977,338

[22] Filed: Nov. 17, 1992

[30] Foreign Application Priority Data

Nov. 23, 1991 [GB] United Kingdom ............... 9125114

[51] Int. Cl.$^5$ ............................................. C09B 67/50
[52] U.S. Cl. ..................... 106/410; 106/20 R; 106/30 R; 106/413; 106/493; 106/496; 106/499; 106/500; 106/502; 106/504
[58] Field of Search ............... 106/493, 496, 499, 500, 106/502, 504, 20 R, 30 R, 410, 413

[56] References Cited

U.S. PATENT DOCUMENTS

| | | | |
|---|---|---|---|
| 1,890,996 | 12/1932 | Kurz et al. | 106/30 R |
| 4,170,487 | 10/1979 | Robertson et al. | 106/499 |
| 4,177,082 | 12/1979 | Robertson et al. | 106/500 |
| 4,188,236 | 2/1980 | Robertson et al. | 106/504 |
| 4,192,841 | 3/1980 | Robertson et al. | 264/117 |
| 4,634,471 | 1/1987 | Foye et al. | 106/262 |
| 4,759,801 | 7/1988 | Goldmann et al. | 106/502 |
| 4,765,841 | 8/1988 | Vinther et al. | 106/402 |
| 5,041,163 | 8/1991 | Booth et al. | 106/493 |
| 5,108,509 | 4/1992 | Booth et al. | 106/493 |

FOREIGN PATENT DOCUMENTS

| | | |
|---|---|---|
| 285713 | 10/1988 | European Pat. Off. . |
| 273236 | 10/1990 | European Pat. Off. . |
| 2249145 | 6/1975 | France . |
| 2275533 | 2/1976 | France . |
| 2384004 | 10/1978 | France . |
| 739873 | 10/1943 | Germany . |
| 63-95270 | 4/1988 | Japan . |
| 63-275668 | 11/1988 | Japan . |
| 1546036 | 5/1979 | United Kingdom . |
| 2008601 | 6/1979 | United Kingdom . |
| 390780 | 4/1993 | United Kingdom . |
| 8912074 | 12/1989 | WIPO . |

OTHER PUBLICATIONS

Chem. Abst. Dyes & Textile Chem. 1945, 422-3 of German Patent 739873 Oct. 1943.
Derw. Abst. 76-04123X03—of FR 2275533 Feb. 1976.
Derw. Abst. 75-32450W/20—of FR 2249145 Jun. 1975.

Primary Examiner—Karl Group
Assistant Examiner—Scott L. Hertzog
Attorney, Agent, or Firm—Michele A. Kovaleski; George R. Dohmann; JoAnn Villamizar

[57] ABSTRACT

A process for the production of a pigment composition, comprising combining a) a dispersion of one or more non-polar components of a surface coating vehicle, or a non-polar additive for the pigment composition in an aqueous solution of a salt of a polar pigment additive, with b) an aqueous slurry of a pigment or a precursor thereof, before, during or after the synthesis of the pigment; and then isolating the pigment composition so obtained.

17 Claims, No Drawings

PRODUCTION OF PIGMENT COMPOSITIONS

The present invention relates to a process for the production of pigment compositions which are useful in the colouration of surface coatings, especially printing inks and paints.

Methods are already known for formulating pigment compositions, which include a carrier, to produce a composition which is in non-powder form. The carriers used in such systems are selected to optimize the incorporation of the pigment composition produced, into the final applicational medium. The underlying principle, in the manufacture of such pigment formulations, is that an organic pigment, having a greater affinity for an oil phase than for an aqueous phase, can be transferred (flushed) from the aqueous phase of a pigment synthesis, into an appropriate oil phase.

The flush process features, and the equipment used have been the subject of much investigation which has resulted in many disclosures of various improvements in the basic concept.

For example, Japanese Patent Kokai Sho 63-95270 describes the preparation of a granular colouring agent by flushing an aqueous pigment slurry directly into an oil varnish, using a high speed dispersing machine. The varnish used is a rosin-modified phenolic resin in a high boiling petroleum distillate.

U.S. Pat. No. 4765841 describes the preparation of an organic pigment dispersion in non-aqueous media by mixing an aqueous pigment slurry, in the presence of a dispersing agent, under vigorous agitation, with a non-aqueous medium. The resulting pigment dispersion is isolated, still containing substantial mounts of water, e.g. 35% water, and this dispersion is de-watered by a specific two-roller technique. The product is a pigment concentrate which typically contains 60% by weight of pigment.

EP 0273236 describes the preparation of an ink by adding, to a pigment slurry, an emulsion comprising, e.g. oleophilic resins, organic solvents and mixtures of these, an emulsifying agent and water. The mixture of pigment and emulsion is then concentrated, and an ink is prepared directly from the concentrate so obtained. EP 285713 discloses a process for the preparation of printing inks comprising preparing a pigment under aqueous conditions and then processing the pigment in a high shear mixer, so that the pigment transfers from the aqueous phase into a non-aqueous phase which is preferably a varnish of the type used in printing inks. Finally, the flushed pigment preparation is further treated in the mixer by adding to it the ingredients which are necessary to produce a printing ink base, which can be subsequently formulated into a printing ink. Japanese Patent Kokai Sho 63-275668 describes a process for the preparation of a readily dispersible pigment, by adding an aqueous alkaline solution of an organic acid, e.g. a rosin or a modified rosin, to an aqueous pigment suspension, which contains a dyestuff derivative having a terminal basic substituent, e.g. an aminomethylene group. The mixture so obtained is then treated with an oil varnish, to effect flushing of the pigment into the varnish, and the desired readily dispersible pigment is isolated.

It is common practice, in the pigments industry, during the manufacture of an organic pigment composition, especially one intended for use in ink applications, to incorporate certain polar additives into the pigment composition. Such additives, e.g. colophonium resin (rosin), enhance the applicational properties, e.g. dispersibility and colour strength, of the pigment in the ink. These additives are normally only soluble in water in their salt form. Accordingly, they are incorporated, as salts, during the aqueous pigment manufacturing process and then precipitated, in non-salt form, into the pigment composition, by means of pH adjustment, prior to filtering off the final composition. It is an essential characteristic, therefore, of such additives that they contain at least one polar, salt-forming group, e.g. a carboxyl, amino or substituted amino group. In addition to such polar, salt-forming additives, it is also desirable to incorporate into the pigment composition, non-polar hydrophobic additives which have a composition similar to, or compatible with the final applicational vehicle, e.g. an ink resin, wax or oil. Incorporation of such additives has normally been achieved by flushing a pigment, either as a presscake or after its synthesis in the vat, with the additive in a vehicle, including the solvent used in the final application, e.g. a high boiling distillate.

While the use of such flushing techniques avoids certain problems, e.g. prolonged drying times, grinding treatment and dusting, associated with conventional pigment powder production methods, flushing processes are not without problems of their own, notably the need to use one or more of volatile organic liquids, surfactants or emulsifiers and high energy mixers.

We have now found a method by which a non-polar hydrophobic surface coating vehicle, or a component thereof, may be readily incorporated into a pigment, during or after the pigment synthesis and prior to the pigment isolation. The new method is simple and economic and avoids the use of extraneous agents, e.g. volatile organic solvents, which present fire and/or explosion hazards, and which are no longer favoured for use in industrial processes, for ecological reasons.

Other extraneous agents which can be avoided by the new method are surfactants and emulsifying agents, which can be detrimental to the lithographic process and which are also subject to ecological pressures. The new method obviates the need for specialised energy intensive mixing equipment, e.g. high speed dispersing machines, and for material which needs to be removed from the pigment composition prior to incorporating the pigment composition into a final surface coating.

Accordingly, the present invention provides a process for the production of a pigment composition comprising combining a) a dispersion of one or more non-polar components of a surface coating vehicle, or a non-polar additive for the pigment composition in an aqueous solution of a salt of a polar pigment additive, with b) an aqueous slurry of a pigment or a precursor thereof, before, during or after the synthesis of the pigment. The pH of the mixture thus obtained may be adjusted to a value at which both the polar additive and the non-polar components, are precipitated onto the surface of the pigment; and the pigment composition so obtained is isolated.

If desired, the step of adjusting the pH of the aqueous pigment slurry containing the non-polar components and the polar additive salt can be omitted, resulting in removal of the water-soluble polar additive salt, during the conventional washing with water of the pigment composition, after isolation and prior to drying, thus giving a final composition comprising substantially pigment and non-polar components.

The aqueous dispersion of the non-polar component, or mixture of non-polar components, in the polar additive salt solution can be prepared by any convenient technique. For example, the non-polar component may be added, preferably with stirring, to an aqueous solution of a salt of a polar pigment additive. This method is the preferred method.

If desired, the dispersion can be formed, without prior formation of the polar additive salt solution, by combining two or more, or all of the components of the dispersion, under stirring, and optionally with heating, and subsequently adding the remaining components of the dispersion, if any, to the mixture so obtained.

The polar pigment additive may be any additive commonly used in the manufacture of organic pigments for surface coatings, e.g. inks. The additive may be a natural or synthetic resin which is insoluble in water in non-salt form and water-soluble in salt form.

Example of such resins include rosin, the principal component of which is abietic acid; also modified rosins such as hydrogenated, dehydrogenated or disproportionated rosin, dimerised or polymerised rosin, partially esterified rosin, non-esterified or partially esterified maleic- or phenolic-modified rosin. Illustrative rosins include such commercially-available materials as Staybelite resin (hydrogenated rosin), Recoldis A resin (disproportionated rosin) and Dymerex resin (dimerised rosin). The additive may also be an amine, e.g. rosin amine D (dehydroabietyl amine), TEPA (tetraethylenepentamine) and Duomeen T (N-tallow-1,3-diaminopropane). Rosin-based resins are preferred for oil ink types while the amine additives are of more value in publication gravure ink systems.

The salt of the polar pigment additive may be formed by conventional methods. For example, when the additive used is rosin, the carboxyl group in rosin may be reacted in water at say 70° C., with a suitable base, e.g. an alkali metal hydroxide such as sodium hydroxide, to form an aqueous solution of the salt form of rosin.

Non-polar components, which are added to the polar pigment additive, may be, but are not limited to, rosin-modified phenolic resins, rosin-modified maleic resins, hydrocarbon resins, alkyd resins, phenolic resins, fatty alcohols, drying, semi-drying or non-drying oils, polyolefins, waxes, litho varnishes, or gloss varnishes.

The physical form of the non-polar component may be that of an oil, a gum, a liquid, a powder, a wax, or a solid. Materials in the form of solid lumps may be powdered, by conventional methods, prior to use.

The relative proportions of polar pigment additive to non-polar component(s) used in the process of the invention may vary within a wide range, but preferably range from 1:50 to 50:1, especially from 1:20 to 20:1 by weight.

The relative proportions of pigment to polar additive plus non-polar component(s) in the final pigment composition may also vary within a wide range, but preferably range from 1:3 to 20:1, by weight.

Various co-additives may be incorporated during the process of the present invention. Examples of such co-additives are dispersing agents, such as polyester derivatives, shading agents and dyestuffs, each of which can aid the processing and/or applicational uses of the eventual pigment composition obtained.

The aqueous pigment slurry used in the process of the present invention may comprise any organic pigment, or precursor thereof, useful in the manufacture of surface coatings, especially printing inks. Suitable pigments include azo or azomethine pigments, or metal salts of these, dioxazine, quinacridone, anthraquinone, isoindoline, isoindolinone or phthalocyanine pigments. Mixtures of pigments may be used.

The product of the process of the present invention may be isolated by any conventional technique, e.g. using a filter press or band filter, using a vibrating sieve, using centrifugation or using suction. The isolated pigment composition is optionally washed and dried, e.g. in an oven, e.g. a conventional or microwave oven, or by a non-static technique, e.g. in a fluidized bed.

The physical form of the pigment composition obtained according to the process of the present invention may range from a liquid paste to a dried powder or granule, depending upon the level of drying applied, the mode of isolation and the (additive + vehicle): pigment ratio. On isolation, prior to drying, a typical aqueous content of the pigment composition would be in the region of 30 to 80%.

The pigment compositions produced according to the process of the invention have a high degree of compatability with conventional surface coatings, especially printing inks, resulting in improved ease of incorporation and dispersibility, colour strength, transparency and gloss, relative to surface coating media produced with conventional powder-form pigments.

The following Examples further illustrate the present invention.

In Examples 1 to 6, the dispersion of the non-polar additive(s) in the polar additive salt solution is prepared by adding the non-polar additive(s), under stirring, to the polar additive dissolved in water as its salt.

EXAMPLE 1

A suspension of 101 parts of pigment Yellow 13 in 2200 parts of water is prepared by coupling, acetoacet-m-xylidide (AAMX) with tetrazotised 3,3¹-dichlorobenzidine (DCB), at pH 4.6 and a temperature of 16° C. The suspension is neutralised with dilute sodium hydroxide and to this is added an aqueous solution of 1.9 parts of dyestuff based on tetrazotised benzidine-2,2'-disulphonic acid (BDSA) and AAMX. A dispersion, consisting of 47.6 parts of ®Staybelite resin (hydrogenated rosin), 5.7 parts of sodium hydroxide, 400 parts of water, and 17.3 parts of ®Kelrez 42-404 (a rosin modified phenolic resin), is added to the pigment suspension containing dyestuff. The suspension is heated to 95° C., whereupon the pH is lowered to 5.0 by slowly adding dilute hydrochloric acid. After heating the suspension at 95° C. for a further hour, the pigment product is isolated by filtration, washed salt-free, and dried in an oven at 65° C., yielding 164 parts of pigment. When incorporated into a heatset varnish system by high-speed stirring followed by a light triple roll mill pass, and compared to an ink made from a Yellow 13 pigment containing ®Staybelite resin and dyestuff only, the product containing ®Kelrez 42-404 has, in particular, much better gloss and dispersibility and also better transparency.

EXAMPLE 2

The procedure outlined in Example 1 is repeated using a dispersion comprising of 26.0 parts of ®Recoldis A resin (disproportionated rosin), 2.5 parts of sodium hydroxide, 130 parts of water, and 26.0 parts of ®MBG 29 resin (a pentaerythritol modified rosin). The yield of pigment is 153 parts. An ink prepared from the pigment product has excellent transparency and gloss compared to inks made from conventional pigment powders containing only rosin.

EXAMPLE 3

The procedure outlined in Example 1 is repeated using a dispersion comprising of 34.0 parts of ®Staybelite resin, 3.9 parts of sodium hydroxide, 230 parts of water, and 34.0 parts of a rosin modified maleic resin. The pigment yield is 168 parts. A heatset ink prepared from the pigment product by beadmilling has superior transparency and gloss to an ink based on a Yellow 13 pigment containing only Staybelite resin and dyestuff.

EXAMPLE 4

A suspension of 67 parts of Pigment Yellow 174 in 1600 parts of water is prepared by coupling a mixture of acetoacet-m-xylidide (AAMX) and acetoacet-o-toluidide (AAOT), in a ratio of 2.7:1, with tetrazotised DCB, at pH 5.0 and a temperature of 15° C. The pH of the suspension is raised to 6.0, whereupon an aqueous solution of 1.5 parts of dyestuff based on tetrazotised BDSA and AAMX is added. A dispersion consisting of 16.5 parts of ®Dymerex resin (dimerised rosin), 0.9 parts of sodium hydroxide, 300 parts of water, and 16.5 parts of ®Kelrez 42-404, is added to the pigment suspension containing the dyestuff. The mixture is heated to 95° C. and then the pH is lowered to 5.5 by slowly adding dilute hydrochloric acid. After heating at 95° C. for a further 10 minutes, the pigment composition is filtered off, washed salt-free, and dried in an oven at 65° C. yielding 100 parts of pigment. The pigment product has greater ease of incorporation and dispersibility than a Yellow 174 pigment containing only ®Dymerex resin and dyestuff.

EXAMPLE 5

Suspension (I): A mixture of 57.5 parts of 2-amino-5-methylbenzenesulphonic acid and 1.5 parts of 2-aminonaphthalene-1-sulphonic acid is diazotised and 44.4 parts of calcium chloride are added prior to coupling.

Solution (II): 60.0 parts of 3-hydroxy-naphthalene-2-carboxylic acid are dissolved in 18.9 parts of potassium hydroxide in 440 parts of water.

Dispersion (III): Prepared from 16.5 parts of ®Staybelite resin, 3.2 parts of potassium hydroxide, 850 parts of water, and 16.5 parts of ®MBG 29 resin.

Dispersion (III) is added to solution (II). This mixture (IV) is added to a coupling vessel containing 1500 parts of water at 10° C. until the pH is 10.9. Coupling is effected by simultaneously adding the remainder of mixture (IV) and solution (I) to the coupling vessel, over a period of one hour, while the pH is maintained at 10.9 and the temperature at 10° C. 6.0 Parts of calcium chloride are added to the pigment suspension thus obtained and after one hour the pH is lowered to 7.4 using dilute hydrochloric acid. The suspension is heated to 80° C., held at this temperature for 10 minutes, then filtered. The presscake is washed salt-free, oven-dried at 70° C., then roasted for 4 hours at 90° C. The pigment yield is 168 parts. A heatset ink prepared from the pigment product by beadmilling has considerably better gloss (approx. 20%) than an ink prepared from a pigment made by the same process but containing only ®Staybelite resin.

EXAMPLE 6

The procedure outlined in Example 1, up to and including the addition of dyestuff, is used to prepare a suspension of 30 parts of Pigment Yellow 13 and 0.7 parts of dyestuff in 520 parts of water. To this suspension is added a dispersion comprising 20.0 parts of ®'Staybelite resin, 120 parts of 1.5% (w/v) sodium hydroxide solution and. 20.0 parts of ®MBG 29 resin (a pentaerythritol modified rosin). The resulting mixture is heated to 95° C. for one hour and the pigment product is isolated by filtration, washed essentially free of salt and the sodium salt of ®Staybelite resin and dried in an air oven at about 65° C., yielding 49 parts of pigment. An ink prepared from the pigment product has excellent gloss and transparency compared to inks made from conventional pigment powders containing only rosin.

In Examples 7 to 10, the dispersion of the non-polar components in the polar additive solution is prepared by combining, in a single step, the non-polar components with the components of the polar additive solution, namely the polar additive, water and sodium hydroxide, while stirring and while heating.

EXAMPLE 7

The procedure outlined in Example 1, up to and including the addition of dyestuff, is used to prepare a suspension of 40 parts of Pigment Yellow 13 and 1.5 parts of dyestuff in 854 parts of water. 20.0 Parts of ®Staybelite resin is dissolved in 5.1 parts of 47% (w/v) sodium hydroxide solution and 168 parts of water. The resin solution is added to the pigment suspension and the resulting mixture is heated to 95° C. whereupon the pH is lowered to 5.0 by slowly adding dilute hydrochloric acid. After heating the suspension for a further hour, a dispersion is added to the pigment slurry comprising 20 parts of ®MBG 29 resin, 10 parts of cetyl alcohol (palmityl alcohol), 10 parts of ®Staybelite resin, 2.6 parts of 47% sodium hydroxide solution and 84 parts of water. The resulting mixture is allowed to cool, while stirring, until the temperature is 60° C., whereupon cold water is added to lower the temperature further. The pigment product is isolated by filtering, washing salt-free and drying in an air oven at 65° C., to yield 99 parts of pigment. An ink prepared from the pigment product has good gloss and transparency compared to inks made from conventional pigments containing only rosin.

EXAMPLE 8

The procedure outlined in Example 7 is followed, except that after heating the pigment slurry and ®Staybelite resin for 45 minutes, a dispersion is added comprising 10 parts of ®MBG 29 resin, 15 parts of cetyl alcohol, 10 parts of ®Staybelite resin, 2.6 parts of 47% sodium hydroxide solution and 84 parts of water. The resulting mixture is allowed to cool while stirring and it is then isolated as before. This yields 92 g of pigment product. An ink prepared from the pigment product has excellent gloss and transparency compared to inks made from conventional pigment powders containing only rosin.

EXAMPLE 9

The procedure for Example 8 is followed, except that 50 parts of Pigment Yellow 13 in 1068 parts of water is treated with a rosin solution comprising 25.0 parts of ®Staybelite resin, 6.4 parts of 47% (w/v) sodium hydroxide solution, and 210 parts of water. The remainder of the procedure is the same, except that the dispersion comprises 5.0 parts of ®MBG29 resin, 15.0 parts of cetyl alcohol, 5.0 parts of ®Staybelite resin, 1.3 parts of 47% (w/v) sodium hydroxide solution and 42.0 parts of water. After isolation, the product yield is 92 parts. An ink prepared from the pigment product has excellent gloss and transparency compared to inks made from conventional pigment powders containing only rosin.

EXAMPLE 10

The procedure for Example 8 is followed, except that 55 parts of Pigment Yellow 13 in 1174 parts of water is treated with 27.5 parts of ®Staybelite resin, 7.1 parts of 47% (w/v) sodium hydroxide and 231 parts of water. The remaining procedure is the same, except that the dispersion comprises 5.0 parts of ®MBG 29 resin, 7.5 parts of cetyl alcohol, 5.0 parts of ®Staybelite resin, 1.3 parts of 47% (w/v) sodium hydroxide solution and 42.0 parts of water. After isolation, the product yield is 98 parts. An ink prepared from the pigment product has excellent gloss and transparency compared to inks made from conventional pigment powders containing only rosin.

EXAMPLE 11

A Pigment Yellow 12 product for publication gravure ink systems is prepared as follows. A solution made from 531 parts of acetoacetanilide (AAA) and 136 parts of sodium hydroxide in 5500 parts of water is acidified by addition of a solution of 335 parts of acetic acid in 1000 parts of water. To the resulting slurry is added a solution of 46 parts of tetraethylene pentamine in 100 parts of water. The slurry is adjusted to pH 5.5 and a temperature of 16° C. The acetoacetanilide is then coupled by addition of a 10% aqueous solution of tetrazotized 3,3¹-dichlorobenzidine over approximately 45 min, maintaining the pH at 4.6 by addition of sodium hydroxide solution. A dispersion of 10 parts of Pigment Orange 34 in a solution of 145 parts of ®Inipol PS in 65 parts of acetic acid and 3100 parts of water is prepared and added to the slurry prepared above. The temperature of the slurry is raised to 95°, held at this temperature for 10 minutes before reducing it to 70° by addition of cold water. The pH of the slurry is adjusted to II by addition of dilute sodium hydroxide solution and stirring continued for 15 minutes before collecting the product washing salt free and drying at 70° C.

We claim:

1. A process for the production of a pigment composition, comprising combining a) a dispersion of one or more non-polar components of a surface coating vehicle or a non-polar additive for the pigment composition in an aqueous solution of a salt of a polar pigment additive, with b) an aqueous slurry of a pigment or a precursor thereof, before, during or after the synthesis of the pigment; and then isolating the pigment composition so obtained.

2. A process according to claim 1 in which the pH of the mixture obtained by mixing dispersion a) with slurry b), is adjusted to a value at which both the polar additive and the non-polar component(s) are precipitated on to the surface of the pigment.

3. A process according to claim 1 in which no pH adjustment is effected and, after isolation of the pigment composition, the pigment composition is washed with water, thereby removing the polar pigment additive.

4. A process according to claim 1 in which the aqueous dispersion of the non-polar component(s) in the polar additive salt solution, is produced by adding the non-polar component(s) to an aqueous solution of a polar pigment additive.

5. A process according to claim 1 in which the polar pigment additive is a natural or synthetic resin which is insoluble in water in the non-salt form, and soluble in water in its salt form; or an amine.

6. A process according to claim 5 in which the resin is an optionally modified rosin, and the amine is dehydroabietyl amine, tetraethylene pentamine or N-tallow-1,3-diaminopropane.

7. A process according to claim 5 in which the additive is rosin, hydrogenated rosin, disproportionated rosin or dimerised rosin.

8. A process according to claim 1 in which the non-polar component is one or more of a rosin-modified phenolic resin, a rosin-modified maleic resin, a hydrocarbon resin, an alkyd resin, a phenolic resin, a fatty alcohol, a drying semi-drying or non-drying oil, a polyolefin, a wax, a litho varnish or a gloss varnish.

9. A process according to claim 1 in which the relative proportion of the polar pigment additive to the non-polar component(s) ranges from 1:20 to 20:1 by weight.

10. A process according to claim 1 in which the relative proportion of pigment to polar additive plus non-polar component(s) in the final pigment composition ranges from 1:3 to 20:1 by weight.

11. A process according to claim 1 in which a co-additive which is capable of aiding the processing and/or applicational uses of the final pigment composition, is incorporated during the process.

12. A process according to claim 1 in which the aqueous pigment slurry comprises an organic pigment useful in the manufacture of surface coatings or a precursor of such a pigment.

13. A process according to claim 12 in which the pigment is an azo or azomethine pigment, or a salt of these; a dioxazine pigment; a quinacridone pigment; an anthraquinone pigment; an isoindoline pigment; a phthalocyanine pigment; or a mixture of these.

14. A process according to claim 13 in which the pigment is an azo pigment.

15. A surface coating containing a pigment composition produced by a process claimed in claim 1.

16. A surface coating according to claim 15 which is a printing ink.

17. A surface coating according to claim 16 in which the printing ink is an offset gravure ink.

* * * * *